United States Patent
Katsumata et al.

(10) Patent No.: US 11,635,952 B2
(45) Date of Patent: Apr. 25, 2023

(54) SECURE UPDATE PROPAGATION WITH DIGITAL SIGNATURES

(71) Applicant: PQShield Ltd, Oxford (GB)

(72) Inventors: Shuichi Katsumata, Tokyo (JP); Thomas Prest, Oxford (GB)

(73) Assignee: PQShield Ltd, Oxford (GB)

( * ) Notice: Subject to any disclaimer, the term of this patent is extended or adjusted under 35 U.S.C. 154(b) by 152 days.

(21) Appl. No.: 17/125,573

(22) Filed: Dec. 17, 2020

(65) Prior Publication Data

US 2021/0216300 A1    Jul. 15, 2021

(30) Foreign Application Priority Data

Dec. 20, 2019  (GB) ...................................... 1918943

(51) Int. Cl.
| | | |
|---|---|---|
| *H04L 9/00* | (2022.01) | |
| *H04L 9/08* | (2006.01) | |
| *H04L 9/32* | (2006.01) | |
| *G06F 21/12* | (2013.01) | |
| *G06F 21/57* | (2013.01) | |
| *G06F 8/65* | (2018.01) | |

(52) U.S. Cl.
CPC ................. *G06F 8/65* (2013.01); *H04L 9/008* (2013.01); *H04L 9/0825* (2013.01); *H04L 9/3247* (2013.01)

(58) Field of Classification Search
CPC . G06F 8/65; G06F 21/12; G06F 21/57; H04L 9/008; H04L 9/0825; H04L 9/3247
See application file for complete search history.

(56) References Cited

U.S. PATENT DOCUMENTS

| | | | | |
|---|---|---|---|---|
| 2007/0118746 A1* | 5/2007 | Lauter | ..................... | H04L 9/008 |
| | | | | 713/170 |
| 2008/0301448 A1* | 12/2008 | Charles | ................. | H04L 9/3066 |
| | | | | 713/176 |
| 2011/0191764 A1* | 8/2011 | Piorecki | ..................... | G06F 8/65 |
| | | | | 717/172 |

(Continued)

FOREIGN PATENT DOCUMENTS

| | | |
|---|---|---|
| WO | WO-2021205154 A1 | 10/2021 |
| WO | WO-2021240157 A1 | 12/2021 |
| WO | WO-2022129898 A1 | 6/2022 |

OTHER PUBLICATIONS

Qun et al. (Qun) U.S. An ID-Based Linearly Homomorphic Signature Scheme and Its Application in Blockchain, published 2018. (Year: 2018).*

(Continued)

*Primary Examiner* — Vu V Tran
(74) *Attorney, Agent, or Firm* — Wilson Sonsini Goodrich & Rosati

(57) ABSTRACT

Certain examples described herein relate to secure update propagation. The examples present systems and methods to transmit data in the form of updates over a network and to ensure the authenticity of the updates. The examples use a set-homomorphic digital signature scheme to sign updates such that a combined digital signature may be used to verify a batch of updates in place of a set of individual digital signatures. The combined digital signature may be generated by aggregating individual digital signatures.

24 Claims, 10 Drawing Sheets

(56) References Cited

U.S. PATENT DOCUMENTS

2013/0326224 A1* 12/2013 Yavuz ............... H04L 9/3247
                                                       713/176
2013/0346755 A1* 12/2013 Nguyen ............. H04L 9/3247
                                                       713/176

OTHER PUBLICATIONS

Albrecht, Martin R. et al. On the concrete hardness of Learning with Errors. Journal of Mathematical Cryptology 9 (2015): 169-203.
Bhargavan, Karthikeyan et al. Formal Models and Verified Protocols for Group Messaging: Attacks and Proofs for IETF MLS. (2019).
Castryck, Wouter et al. CSIDH: An Efficient Post-Quantum Commutative Group Action. IACR Cryptol. (2018): 383.
Cheng, Haitao et. al. CCA Secure Multi-recipient KEM from LPN. ICICS (2018).
Co-pending U.S. Appl. No. 17/937,969, inventors Prest; Thomas et al., filed Oct. 4, 2022.
Gilles, Barthe et al. Galactics: Gaussian Sampling for Lattice-Based Constant-Time Implementation of Cryptographic Signatures, Revisited. IACR, vol. 20190520:130221 (2019): 1-26.
Gilles, Barthe et al. Masking the GLP Lattice-Based Signature Scheme at Any Order. IACR, vol. 20181017:145402 (2018): 1-51.
Halder, Subir et al. Don't hesitate to share! a novel IoT data protection scheme based on BGN cryptosystem. Designing Interactive Systems Conference. ACM 2 Penn Plaza, Suite 701, New York, NY 10121-0701 USA (2019): 284-291.
Hoffstein, Jeffrey et al. NTRUSIGN: Digital Signatures Using the NTRU Lattice. CT-RSA (2003).
Jao, David, et al. Supersingular isogeny key encapsulation. NIST Round 1 (2017).
Klooss, Michael et al. (R)CCA Secure Updatable Encryption with Integrity Protection. Advances In Databases and Information Systems; [Lecture Notes in Computer Science; Lect.Notes Computer]. Springer International Publishing, CHAM (2019): 68-99.
Lewi, Kevin et al. Securing Update Propagation with Homomorphic Hashing. IACR Cryptol. (2019): 227.
Linder, Richard and Chris Peikert. Better Key Sizes (and Attacks) for LWE-Based Encryption. IACR Cryptol (2010): 592.
Migliore, Vincent et al. Masking Dilithium: Efficient Implementation and Side-Channel Evaluation. IACR, vol. 20190418:190035 (2019): 1-28.
Nejatollahi, Hamid et. al. Post-Quantum Lattice-Based Cryptography Implementations. ACM Computing Surveys (CSUR) 51 (2019): 1-41.
PCT/GB2021/050838 International Search Report and Written Opinion dated Jun. 7, 2021.
PCT/GB2021/051288 International Search Report and Written Opinion dated Jul. 21, 2021.
PCT/GB2021/053300 International Search Report and Written Opinion dated Feb. 25, 2022.
Prest, Thomas et al. FALCON technical report, published by the National Institute of Standards and Technology (2019).
Rossi, Melissa. Extended Security of Lattice-Based Cryptography. (2020): 1-205.
Yao, Jiang. The Direction of Updatable Encryption does not Matter Much. IACR. vol. 20200528:141110 (2020): 1-42. Retrieved from the Internet:URL:http://eprint.iacr.org/2020/622.pdf.

* cited by examiner

| Notation | Value |
|---|---|
| $n$ | 1024 |
| $q$ | 6873089 |
| $\sigma$ | $1.54\sqrt{q}$ |
| $k$ | 1000 |
| $\beta$ | $\lceil \tau_{\text{SIG}} \cdot \sigma\sqrt{2nk} \rceil$ |
| $\tau_{\text{SIG}}$ | 1.2 |
| $\beta_\infty$ | $\lceil \sigma\sqrt{2k \cdot \log\left(\frac{4n}{p}\right)} \rceil$ |
| $|sk|$ | 2816 |
| $\lambda$ | 100 |

Alg. 1 KeyGen($n, q$)

Require: Ring dimension $n$, integer modulus $q$
Ensure: A public key pk = $h \in \mathcal{R}_q$, a private key sk = $\mathbf{B} \in \mathcal{R}^{2 \times 2}$
1: Generate short polynomials $f, g, F, G$ in $\mathcal{R}$ such that $fG - gF = q$
2: $h = g \cdot f^{-1} \mod q \in \mathcal{R}_q$
3: $\mathbf{B} = \begin{bmatrix} g & -f \\ G & -F \end{bmatrix}$
4: return (pk = $h$, sk = $\mathbf{B}$)

FIG. 10A

Alg. 2 Sign(msg, sk)

Require: A message msg and a private key sk
Ensure: A signature sig of msg
1: Use sk to compute $(s_1, s_2) \in \mathcal{R}$ such that:
 — $s_1 + s_2 h = H(\text{msg})$
 — $\|(s_1, s_2)\|_2 \leq \beta$
 — $\|(s_1, s_2)\|_\infty \leq \beta_\infty$
2: return sig = $s_2$

FIG. 10B

Alg. 3 Verify(msg, sig, pk)

Require: A message msg, a public key pk and a
 signature sig
Ensure: True or False
1: $s_1 = H(\text{msg}) - s_2 h$
2: if $\|(s_1, s_2)\|_2 \leq \beta$ and $\|(s_1, s_2)\|_\infty \leq \beta_\infty$ then
3:  return True
4: else
5:  return False
6: end if

FIG. 10C

SECURE UPDATE PROPAGATION WITH DIGITAL SIGNATURES

CROSS REFERENCE

This application claims the benefit of United Kingdom Patent Application Number 1918943.0, filed Dec. 20, 2019, which application is incorporated herein by reference.

TECHNICAL FIELD

The present invention relates to cryptographic methods and systems. In particular, the present invention relates to the secure propagation of updates using a set-homomorphic digital signature scheme. The examples may be used to securely distribute information and update computer programs across a network.

BACKGROUND

Modern computing systems typically comprise a plurality of computing devices communicatively coupled by one or more computer networks. Within distributed computing systems there is a challenge of securely propagating data updates across multiple computing devices. Data updates may comprise information updates, e.g. changes to a database or other information source, and/or computer program updates, e.g. software updates to improve functionality and/or security.

Mobile operating systems, such as iOS from Apple Inc. or Android from Google LLC, typically use a centralised service to install and update mobile applications. Users may select and install mobile applications using their mobile device, and updates are regularly published and administered via the centralised service. Linux distributions provide a similar service for the Unix-like family of open-source operating systems based on the Linux kernel. In Linux operating systems, a software manager on a computing device may connect to one or more centralised services (so-called "repositories") to determine if software updates exist and if so to download and install those updates. In both cases it is common for a computing device to be offline for a number of days, and then to reconnect to the centralised systems and require a plurality of software updates to be applied on the device. It is also common for different users to have different sets of installed applications, such that different computing devices need different sets of updates.

Large distributed applications may also rely on secure update propagation to synchronise information across a distributed computing system. For example, many distributed applications comprise a distributed database of information, where records in the database need to be synchronised between a plurality of content servers (as well as with user devices). In these cases, a common central content database may be synchronised across multiple locations to improve availability and read latency for end users who wish to access the content. In this case, database modifications may need to be propagated to each location to maintain the consistency of replicated data objects with a central or master database.

One issue with propagating updates across a distributed computing system is asynchrony. From their very nature, distributed networks cannot instantaneously propagate an update. For example, it takes a finite time for an update to be transmitted over one or more networks, and data often needs to travel across multiple nodes in the networks. However, it is desired that these distributed networks should nevertheless maintain functionality and security.

Another issue is security. Subscribers to updates need to be sure that the updates are authentic. If a malicious party is able to take control of a distributed update system, they may be able to compromise data integrity. A subscriber of an update needs to authenticate the update, e.g. ensure that it comes from a reputable or trusted source. For example, if a malicious party were to intercept software updates, and replace the data of the update with their own malicious code, then computing devices within the distributed computing system may be compromised, allowing the malicious party to take control of the devices and/or steal information.

A further issue is the heterogeneity of modern computing devices and communication networks. For example, nearly half the world's population owns a smartphone or other form of portable computing device. These often connect to computer networks through a variety of wireless connections of varying quality and bandwidth. To securely update these devices, or propagate information updates, mobile computing devices are often limited to these connections to securely update devices, or to receive information updates.

In the paper "Securing Update Propagation with Homomorphic Hashing" by Lewi et al. published in the Cryptology ePrint Archive, Report 2019/227, 2019, (and incorporated herein by reference) it is explained how Facebook, Inc. uses distributed update propagation to maintain its large social media infrastructure. A number of approaches for secure update propagation are discussed, before a solution based on homomorphic hashing is described. While this solution provides a useful contribution, it suffers from a lack of flexibility, e.g. due to a strict ordering that is imposed on the updates, and a need to keep a track of the state of the updates.

It is thus desirable to provide update propagation solutions that are low-complexity, scalable and that can cope with the make-up of modern distributed computing systems. It is further desired that the update propagation solutions are secure, especially in the face of new attacks enabled by quantum computing.

SUMMARY

Aspects of the present invention are set out in the appended independent claims. Certain variations of the invention are then set out in the appended dependent claims.

BRIEF DESCRIPTION OF THE DRAWINGS

Examples of the invention will now be described, by way of example only, with reference to the accompanying drawings, in which:

FIGS. 10A to 10C are illustrated pseudo-code formulations showing cryptographic functions for one implementation of set-homomorphic digital signature scheme according to an example.

DETAILED DESCRIPTION

Figure 1:
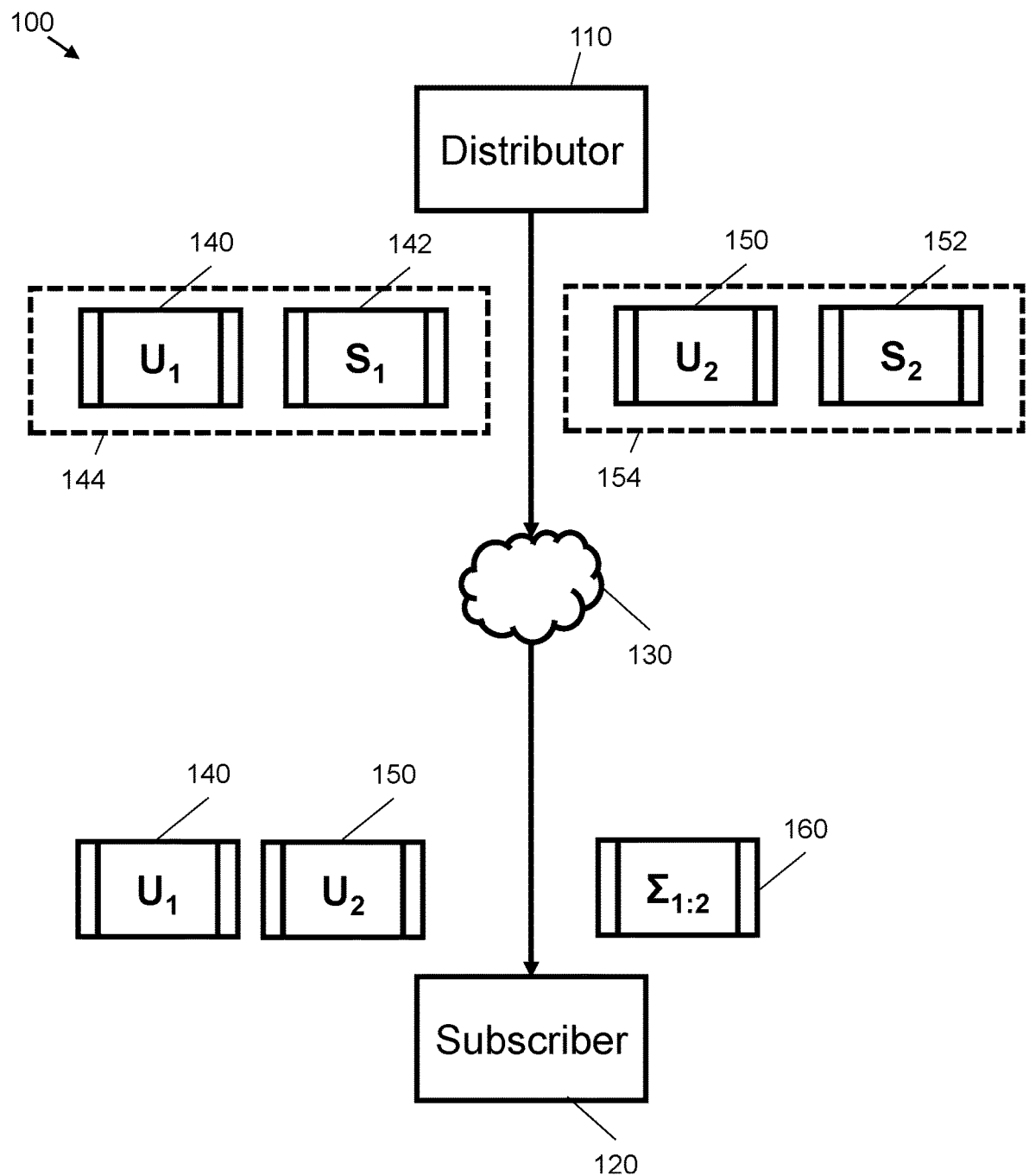
FIG. 1 is a schematic illustration showing a secure update propagation system according to an example.

Certain examples described herein provide improved secure update propagation wherein updates are signed according to a set-homomorphic digital signature scheme. The use of a set-homomorphic digital signature scheme enables a resulting secure update propagation scheme to be simultaneously scalable, flexible and stateless. This provides improvements over comparative schemes, including those that use homomorphic hashes. The set-homomorphic digital signature scheme allows a combined digital signature to be generated by combining individual digital signatures, yet be verifiable using the same digital signature scheme.

Certain examples described herein consider the propagation of updates in distributed computing networks from a cryptographic viewpoint. For simplicity, examples are described that consider a single node that is configured to send updates to other nodes on at least one computing network. The single node is referred to as a distributor and the other nodes are referred to as subscribers. The nodes are computing devices of various forms, and include server devices, mobile devices, desktop devices etc. Although examples are provided using one distributor for clarity, the examples are able to be implemented in systems where there are a plurality of distributors.

Certain examples described herein relate to the propagation of updates. In examples "propagation" refers to the communication of information between computing devices, such as the propagation of data between computing devices in a computer network. In the examples, propagation begins with a distributor as a source. Subscribers are then devices that receive data from the distributor, e.g. data that has been propagated through one or more of the nodes and the computer network. In the examples described herein, "updates" may comprise any form of data or digital information that may be communicated between computing devices. "Updates" include database updates, e.g. defined modifications to a synchronised distributed database, information updates, e.g. messages that are to be received by a plurality of subscribers from the distributor as a publishing device, and software updates, e.g. modifications and updates to computer program code stored and executed on computing devices (including both operating system or kernel software and application software). Although, applications often include one-to-many arrangements for update propagation, the approaches described herein are equally applicable to one-to-one or many-to-many arrangements.

Certain examples described herein provide for "secure" propagation of updates. In examples, security is provided in the form of a method for verifying that data originates from a party that has in their position a particular secret, i.e. in an authentication method. In examples, this party may be the distributor, such that subscribers are able to verify that a particular update originated from the distributor. Authentication is achieved herein through the use of digital signatures.

Certain examples described herein use a digital signature scheme that is based on a public key cryptography framework. Within this framework, a signing device such as a distributor, has a secret key and a public key. The public key is distributed to subscribers, whereas the secret key is kept private and confidential, e.g. only accessible to the distributor. The secret key is used to generate one or more digital signatures for one or more respective updates. The subscribers may use the public key to verify that the updates have been properly signed using the secret key. As only the distributor has access to the secret key, this may be used to indicate that the updates are authentic, e.g. that they originate from the distributor and have not been modified during distribution.

Certain examples provide a particular type of digital signature scheme that allows scalable, flexible and stateless update propagation. In addition, certain examples also provide post-quantum security, i.e. methods that are provably secure against attack using algorithms processed by quantum computers. Post-quantum security may be provided using a lattice-based implementation of the set-homomorphic digital signature scheme, where the digital signatures and cryptographic keys may be matrices or vectors whose coefficients are ring elements.

FIG. 1 shows a system 100 for the secure propagation of updates. The system comprises a distributor 110 and a subscriber 120. The distributor 110 and the subscriber 120 may be any form of computing device, e.g. any device comprising a processor and memory, including server computers, desktop computers, laptop computers, smartphones, and embedded devices. In one case, the distributor 110 may comprise a server computing device that is configured to provide a plurality of updates to a number of subscribers, to which the illustrated subscriber 120 belongs. In FIG. 1, the distributor 110 and the subscriber 120 are communicatively coupled by one or more networks 130. These networks 130 may be unsecured networks such as the Internet. The devices that make up the networks 130 and that pass information from the distributor 110 to the subscriber 120 may be untrusted, e.g. it is possible that these devices comprise one or more malicious devices. The one or more networks 130 may comprise a mixture of wired and wireless networks and operate according to a variety of access protocols (including telecommunication protocols and computer networking protocols).

In FIG. 1, the distributor 110 is configured to publish a plurality of updates that, in this example, comprise a first update 140 and a second update 150. Although examples are described in terms of two updates for simplicity, it should be noted that real-world examples may typically involve a much greater number of updates. Furthermore, although reference is made to an example with "first" and "second" updates, order is not important, i.e. the updates may be published and/or combined in any order. The updates may comprise computer program code to update operating systems or applications on subscriber devices, digital information to distribute, and/or updates to a distributed database. In FIG. 1, the first update 140 has an associated first digital signature 142. The first digital signature 142 may be generated by the distributor 110, e.g. by individually signing the update using a signature engine as described in more detail below. The first update 140 and the first digital signature 142 may be packaged as first update data 144, e.g. as a compressed package or the like, or in other examples may be distributed separately. The second update 150 also has an associated second digital signature 152. This may be generated in a similar manner to the associated first digital signature 142, but using the second update 150 as input data as opposed to the first update 140. The distributor 110 may be configured to generate an accompanying digital signature as part of an automated publication operation, e.g. as part of a deployment of an approved update. The first and second updates 140, 150 may represent two different updates at two different points in time (e.g. the second update 150 being a later update) and/or two different updates for two different software applications.

As shown in FIG. 1, the subscriber 120 is configured to receive the first update 140 and the second update 150 from the distributor 110 over the one or more networks 130. If the one or more networks 130 use a packet-switching protocol, then the data paths for each update may be different. The first update 140 may be received prior to the second update 150. In other cases, the first update 140 and the second update 150 may be obtained within a common time period and/or in reverse order. The first and second updates 140, 150 may be received from different devices within the one or more networks 130. In one case, the first and second updates 140, 150 may be received together in response to an update request from the subscriber 120. Many different methods for obtaining the data are possible.

As well the first and second updates 140, 150, the subscriber 120 also receives a combined digital signature 160. The combined digital signature 160 is a combination of the first digital signature 142 and the second digital signature 152. The combined digital signature 160 may be generated using the first digital signature 142 and the second digital signature 152 without re-signing a combined set of data. The subscriber 120 is configured to verify the first update 140 and the second update 150 using the combined digital signature 160. For example, the subscriber 120 may comprise a verification engine as described in later examples. The subscriber 120 may be configured to combine the first and second updates 140, 150 into a single set of data and apply the verification engine to this data and the combined digital signature 160. If the first update 140 and the second update 150 are successfully verified using the combined digital signature 160, then both updates may be applied at the subscriber 120. This may comprise updating local software and/or databases using the updates.

In the example of FIG. 1, the first digital signature 140, the second digital signature 150 and the combined digital signature 160 are all generated using a set-homomorphic digital signature scheme. Within a set-homomorphic digital signature, a signature of a union of a first message and a second message is equal to a binary operation applied to a first signature of the first message and a second signature of a second message. Depending on the signature scheme that is used, in certain cases the binary operation may comprise a summation or a multiplication. This is a specific property that distinguishes a set-homomorphic digital signature from comparative classical digital signatures. In comparative classical digital signature schemes, there is no restriction with regard to the combined signature. In comparative classical digital signature schemes, a digital signature of the combined data of the first and second updates does not equal a function of the separate digital signatures of each independent update. Put another way, a signature scheme is said to be set-homomorphic if for any disjoint sets S, T and valid signatures $sigs \leftarrow Sign(sk, S)$ and $sig_T \leftarrow Sign(sk, T)$, their sum $sigs*sig_T$ is a valid signature of $S \cup T$, that is: $sig_S*sig_T \in Sign(sk, S \cup T)$, where Sign( . . . ) is a signing function that takes a secret key (sk) and data, and where * is a binary operator that may be an addition or multiplication. The binary operator * may represent a function that receives two signatures as input and outputs another signature, where the output signature is still a valid signature according to the digital signature scheme. The set-homomorphism may have an associated defined probability, e.g. the equality may be set to hold with a predefined probability.

By way of set-homomorphism, a combined digital signature of two portions of data is equal to a function of the digital signatures of each portion of data obtained separately. Given this, the combined digital signature 160 in FIG. 1 may be obtained in one of two ways. In a first case, the combined digital signature 160 may result from applying a signing function to the first and second updates 140, 150 in combination, and in a second case, the combined digital signature 160 may result from applying a binary operator to the first digital signature 142 and the second digital signature 152. This provides flexibility for how updates are distributed. For example, in one case, the distributor 110 may be configured to generate a combined digital signature 160 by combining, then signing, the first and second update data 140, 150. In another case, a device within the one or more networks 130 may collate the first and second digital signatures 142, 152 and generate the combined digital signature 160 through summation without needing access to the secret key of the distributor 110. In yet another case, the distributor 110 itself may generate the combined digital signature 160 without using the signing function by summing the first and second digital signatures 142, 152.

Here, references to "combine" include any aggregation operation that may be applied to a digital signature. In one case, digital signature may be represented as a sequence of bits (e.g. a "binary string") the aggregation operation may be a binary operation such as summation or multiplication, where the binary operation may be associative and commutative. Other functions beside summation and multiplication may also be possible. A combined digital signature may also be referred to as an aggregate digital signature. In certain cases, there may be multiple ways in which digital signatures may be combined. These included: 1) combining N signatures of 1 message by N different users; 2) combining N signatures of N different messages by 1 user; and 3) combining N signatures of N different messages by N different users. In the examples discussed herein, the set-homomorphic digital signature scheme is applied in the second case (2)—N signatures of N different messages by a distributor are combined. In other examples, the third case (3) may be used if there are a plurality of distributors, with appropriate adaptations to the example digital signature schemes described herein. The set-homomorphic digital signature scheme may be based on a lattice-based digital signature scheme (summation), a Rivest Shamir Adleman—RSA—digital signature scheme (multiplication) or a Boneh Lynn Shacham—BLS—digital signature scheme (multiplication), amongst others.

The examples described herein also provide scalability and statelessness. Using the framework described above, the subscriber 120 may fetch a missing batch of m updates. Instead of requiring m separate digital signatures for each update, they may be able to easily obtain a combined digital signature 160 covering all m updates. This combined digital signature 160 may be generated by devices other than the distributor 110 by simply combining digital signatures for the m updates. The subscriber 120 only needs to receive one portion of data for verification, i.e. each digital signature may have a common size of n bits, so receiving one combined digital signature instead of m separate digital signatures frees up (m−1)*n bits. Also, the subscriber 120 only needs to verify one signature as opposed to m signatures, freeing up computation resources on the subscriber 120. Furthermore, neither the distributor 110 nor the subscriber 120 needs to maintain a state—the digital signatures may be combined in any order and any subset of a sequence of digital signatures may be combined for verification. As each update is independent, the examples achieve very good flexibility: the protocol remains fully functional and secure in the presence of out-of-order or missing updates. This makes the present examples suitable for highly scalable networks, including those consisting of low-powered embedded devices (e.g. the so-called Internet of Things).

Figure 2A:
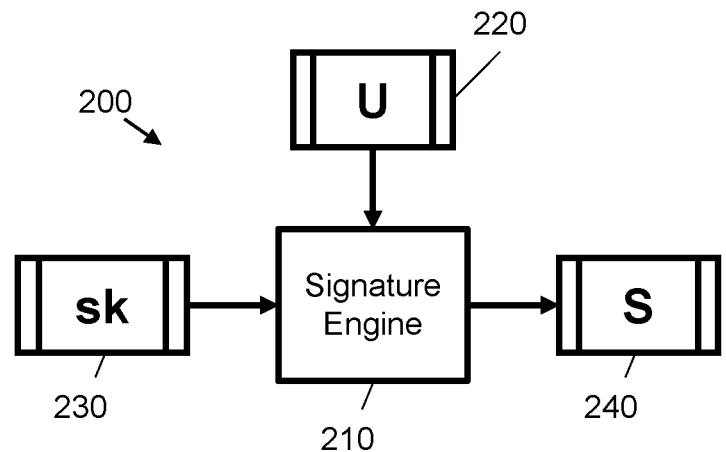
FIG. 2A is a schematic illustration showing a signature engine for a distributor according to an example.

FIG. 2A shows an example 200 of how the distributor 110 of FIG. 1 may implement a signing function. FIG. 2A shows a signature engine 210 to perform the signing function. The signature engine 210 may comprise computer program code that is loaded into a memory and executed by a processor and/or a dedicated hardware signing device (e.g. as part of a security chip on a motherboard). The signature engine 210 receives an update 220 and a secret key 230. The update 220 may comprise any data that is representable as a binary or hexadecimal string. The update 220 may be considered to be message data for the signature engine 210. In one case, the signature engine 210 may be arranged to generate a binary string representation of the update 220 (or another representation of a sequence of bits). The secret key 230 may be part of a key pair, where the key pair also comprises a corresponding public key. The secret key 230 may only be accessible to the device implementing the signature engine 210, such as the distributor 110. In one case, the distributor 110 may implement a key generation algorithm to generate the key pair. This may only need to be performed once at a setup stage. The secret key 230 from the key generation algorithm may be used repeatedly to sign updates 220. The output of the signature engine 210 is a digital signature 240. The digital signature 240 may comprise a sequence of bits of a predefined (and configurable) size.

Figure 2B:
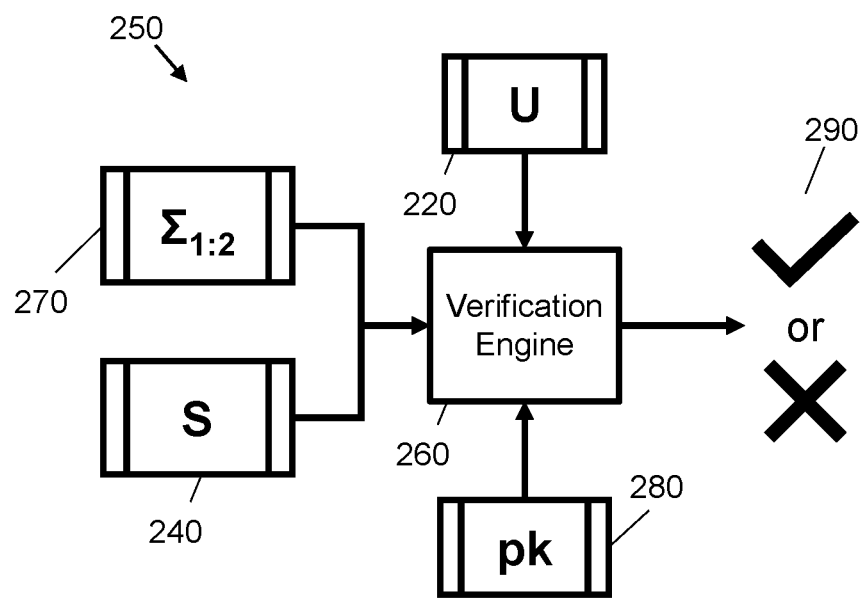
FIG. 2B is a schematic illustration showing a verification engine for a subscriber according to an example.

FIG. 2B shows an example 250 of how the subscriber 120 of FIG. 1 may implement a verification function that corresponds to the signing function of FIG. 2A. In one case, the set-homomorphic digital signature scheme may consist of a key generation algorithm, the signing function and the verification function. In FIG. 2B, the verification function is implemented by a verification engine 260. Again, the verification engine 260 may comprise computer program code that is loaded into a memory and executed by a processor and/or a dedicated hardware signing device (e.g. as part of a security chip on a motherboard). The verification engine 260 takes as input a digital signature, an update 220 and a public key 280. The update 220 may be provided in a similar form to the signature engine 210, e.g. as a form of message comprising a binary or hexadecimal string. The public key 280 may comprise the other half of the key pair generated by the previously described key generation algorithm. In one case, the public key 280 may be (freely) distributed by the distributor 110 during an initial configuration or registration step. The verification engine 260 may receive either a digital signature generated by the signature engine 210, such as signature 240, or a combined digital signature 270. Both signatures have the same format, e.g. are both valid signatures according to the digital signature scheme. The verification engine 260 is agnostic as to how the signature is generated, e.g. either directly using the signature engine 210 or indirectly by combining a plurality of individual digital signatures 240 generated by the signature engine 210. The verification engine 260 is configured to process the input and output a verification result 290 indicating whether the update 220 is verified to have originated from the distributor 110 (i.e. directly or indirectly from the use of secret key 230 and signature engine 210). If verification is successful (e.g. as indicated by the tick in FIG. 2B), then the update may be applied (e.g. either as a software or database update). If verification fails (e.g. as indicated by the cross in FIG. 2B), then the update may be quarantined or deleted. In certain cases, a user may be notified of the verification result 290.

The signature engine 210 of FIG. 2A and the verification engine 260 of FIG. 2B may form part of a digital signature scheme that may be seen to provide a digital analogue to physical signatures. First, a party (called the signer) conjointly generates a public key (pk) and a secret or private key (sk), distributing the former and keeping the latter for themselves. The private key allows the signer to compute a signature sig=Sign(sk, msg) for any message msg by applying a signing function or procedure. The public key (pk) allows any recipient of a message msg sent by the signer to verify its authenticity by checking whether a verification function or procedure Verify(pk, msg, sig) accepts a signature sig as a valid signature of the message msg; however, the private key pk does not help to compute a signature. This replicates a feature of real-life signatures, which can be easily verified by anyone but (ideally) only performed by the legitimate signer.

In certain cases, the examples 200, 250 may be implemented using secure electronic circuitry and/or computer program code arranged to be securely stored and processed by a processor. Secure electronic circuitry may be based on electronic circuitry such as a System-on-Chip (SoC), an Application-Specific Integrated Circuit (ASIC) or a Field Programmable Gate Arrays (FPGA). In certain cases, components to implement the digital signature scheme may be packaged as hardware and/or software for use by a computing device, e.g. a computer program code library or system chip may be provided that implements the key generation, signing and verification functions.

Figure 3:
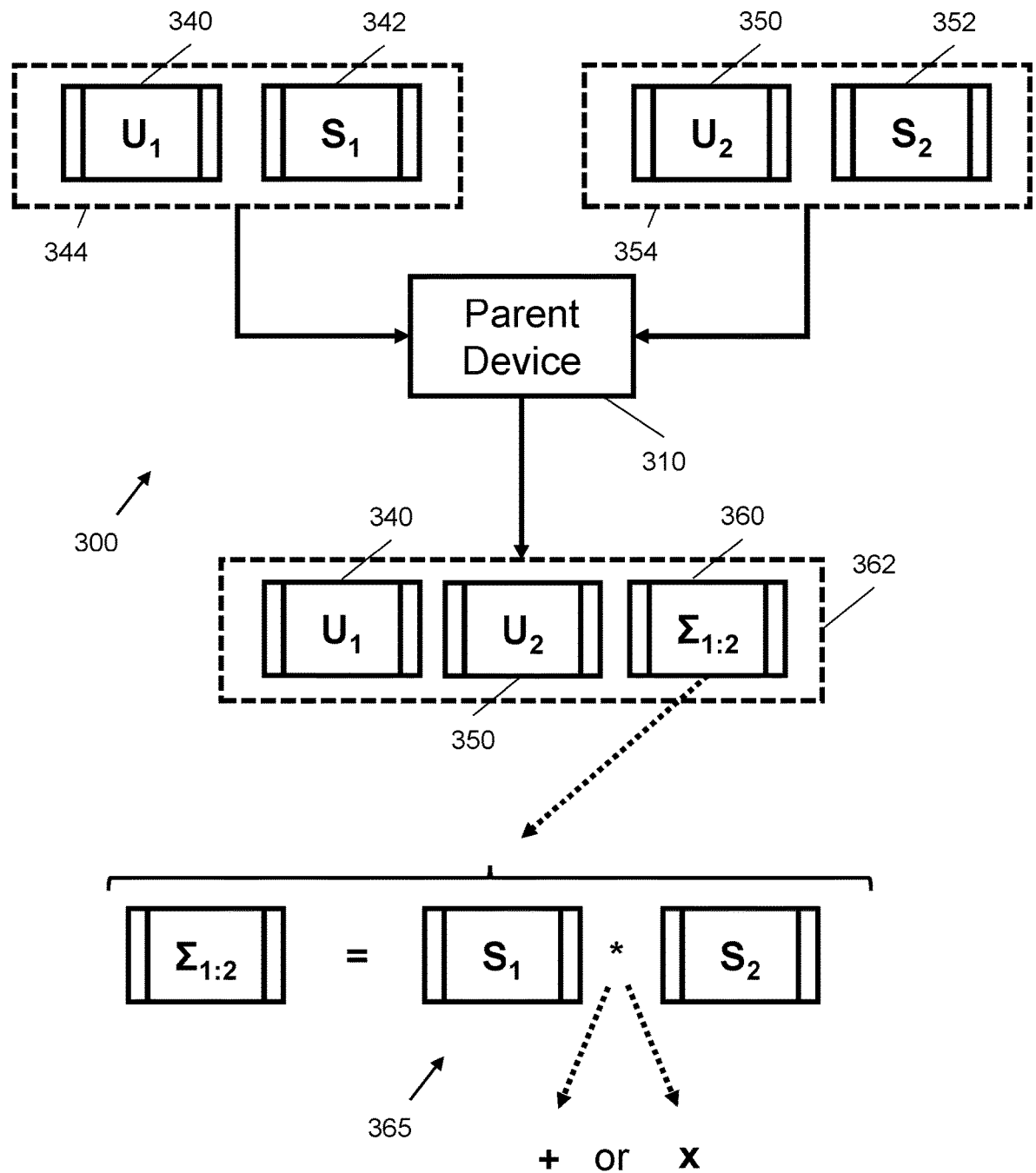
FIG. 3 is a schematic illustration showing a parent device generating a combined digital signature according to an example.

FIG. 3 shows an example 300 of how the combined digital signature 160 of FIG. 1 may be generated by a parent device 310 for further distribution to a child device comprising a subscriber. The parent device 310 may comprise the distributor 110 of FIG. 1 or a computing device along a network path to the subscriber 120, e.g. a parent node in a distribution tree. The parent device 310 may comprise an intermediate subscriber, i.e. a subscriber that is communicatively coupled to the subscriber 120 in a system that allows for distributed application and forwarding of updates.

In the example of FIG. 3, the parent device 310 obtains a first update 340 and a second update 350. These may be received from a distributor, or generated at the parent device 310. Although two updates are shown for ease of example, like the example of FIG. 1, any number of updates may be obtained in any order. In one case, the parent device 310 may be a subscriber similar to subscriber 120 of FIG. 1 that is communicatively coupled to a distributor. In this case, the first update 340 and the second update 350 may be received from the distributor. As per FIG. 1, the first update 340 has an associated first digital signature 342 and is provided, together with the first update 340, as a first update package 344. Similarly, the second update 350 has an associated second digital signature 352 and is provided, together with the second update 350, as a second update package 354. The update packages 344, 354 may be obtained together, e.g. in response to a request for available updates, or received at different points in time, e.g. as per a periodic pull update system or a push update system.

In FIG. 3, the parent device 310 processes the first update package 344 and the second update package 354 for sending to a further device. That further device may comprise another subscriber. The result of the processing is a combined digital signature 360, similar to the combined digital signature 160 of FIG. 1. The parent device 310 is configured to generate a third update package 362 that comprises the first update 340, the second update 350 and the combined digital signature 360. As shown by arrow 365, the combined digital signature 360 is generated at the parent device 310 by applying a binary operator to the individual first and second digital signatures 342, 352. This may be a summation or multiplication, depending on the underlying digital signature scheme. This may be performed without the secret key 230 or the signature engine 210 of FIG. 2A, e.g. simply as a binary addition or multiplication. The parent device 310 may then send the third update package 362 to the further device to allow that device to verify and selectively apply the first update 340 and the second update 350.

If the parent device 310 is itself a subscriber, as it receives the first and second update packages 344, 354, it may use a verification engine similar to the verification engine 260 of FIG. 2B to individually verify the updates using the individual digital signatures 342, 352. If verification is successful, it may apply the updates.

In one case, one or more of the generation of the third update package 362 and the sending of the package may be performed at the parent device 310 in response to a request from a subscriber. For example, the subscriber may comprise a computing device with intermittent connectivity and so when they come online they may make a request for any outstanding updates. In another case, the subscriber may request any outstanding updates at predefined times while switched on. Although, two updates are shown for the simple example 300, real-world cases may have many updates that are to be combined and sent to the subscriber device. For example, the request may be made by an application manager or software update manager. In this example, instead of having to send the first and second update packages 344, 354 in response to the request, it may instead send the smaller third update package 362, saving bandwidth and verification time.

In certain examples described herein, a distributor may provide updates according to an update policy. An update policy may indicate how updates are to be selectively applied across a set of one or more subscribers. Each subscriber may also have an update policy, e.g. indicating which updates are to be requested and applied. In certain cases, the distributor may enact an update policy: this may include deciding what the updates are and when to apply them. It may also apply more detailed policies, for example: specifying distinct updates for different groups of users or subscriber devices, and/or specifying dependencies (or lack thereof) between distinct updates. An update policy may also indicate updates that are applicable to all users. For example, it is often desirable that all users have applied the latest operating system updates applicable to them, both for interoperability and security reasons. A detailed update policy may, for example, indicate how to forward distinct batches of updates to different sets of subscribers.

Figure 4A:
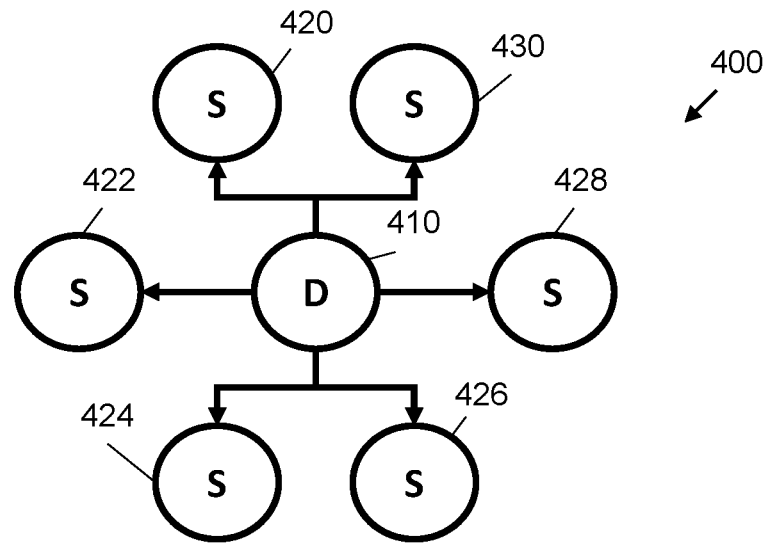
FIGS. 4A and 4B are schematic illustrations showing example device arrangements for a secure update propagation system.
Figure 4B:
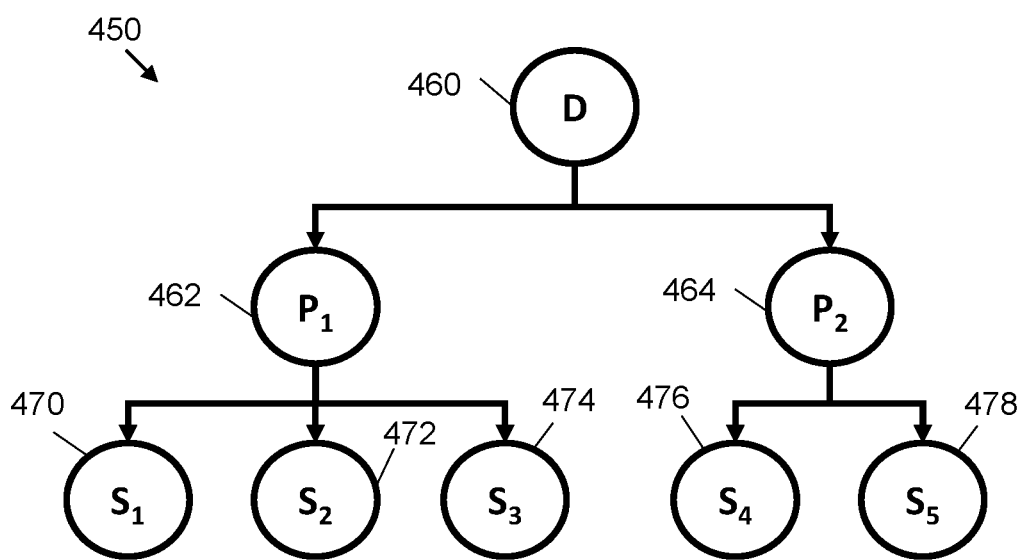

FIGS. 4A and 4B show first and second examples of different logical device arrangements that may be used to securely propagate updates. The secure update propagation examples described herein are compatible with many different logical device arrangements and the arrangements of FIGS. 4A and 4B are shown for example only.

FIG. 4A shows a first example 400 of centralized update propagation. In this case, a distributor 410 is logically coupled to a plurality of subscribers 420 to 430, wherein each subscriber has a logical connection to the distributor 410. In this case, a "logical connection" may refer to a coupling configured over one or more communication protocols that may represent an abstraction over lower layer communication protocols. The distributor 410 may comprise an implementation of the distributor 110 of FIG. 1. One issue with the arrangement of FIG. 4A is that the distributor 410 requires bandwidth capabilities that scale linearly with a number of subscribers. The arrangement 400 of FIG. 4A thus has comparatively lower scalability.

The example 450 of FIG. 4B has better scalability and is also compatible with the set-homomorphic digital signature scheme described herein. The example 450 may be applied in a similar star configuration to FIG. 4A but uses intermediate devices to provide a distributed network that can operate at scale. In FIG. 4B, a distributor 460 is logically coupled to two parent devices 462 and 464. These parent devices 462 and 464 may be implemented as explained with reference to the parent device 310 of FIG. 3. The first parent device 462 is logically coupled to three subscriber devices 470, 472 and 474 and the second parent device 464 is logically coupled to two subscriber devices 476 and 478. If the parent devices 462, 464 themselves comprise subscribers, then the distributor is able to send the updates to a subset of subscribers, which will themselves transfer them to other subscribers, and so on until the updates are distributed to every subscriber in the network. In the arrangement of FIG. 4B, the distributor assumes the role of the root of a tree, with the subscribers being the other nodes.

The set-homomorphic digital signature scheme described herein addresses an issue of ensuring the authenticity of updates. For example, it allows a subscriber such as 472 or 476 to be sure that an update was created by the distributor and not by another device, such as parent device 462 or 464. The digital signatures described herein can be verified by anyone knowing the public key (pk) of the signer, but can be computed only by the signer (using a secret or private key—sk—known only by them).

The set-homomorphic digital signature scheme described herein is scalable, flexible and stateless. Comparative secure update propagation schemes have difficulty providing all three properties simultaneously.

For example, in a comparative scheme, a distributor may sign each update separately, where each update is then treated independently at a subscriber. In this case, the number of updates and verifications that need to be performed scales in proportion to a number of missed updates. In this case, the comparative solution has poor scalability with respect to the number of missed updates—scaling is linear, if a subscriber has missed m updates, they download m signatures and perform m verifications. However, digital signature based approaches do enable statelessness—each update is self-contained—and also flexibility is provided as missing or out-of-order updates do not affect functionality. This may be contrasted with chain-based systems where each update is dependent on one or more previous updates.

Another comparative approach is to digital sign a whole set or database of updates following each change of state (e.g. following an addition of a new update). The computational cost of this comparative approach is a linear function of the total number of updates. However, a subscriber may only need to download and verify one signature for missed updates (e.g. they verify the signature relating to the latest state of the database). Hence, although scalability is improved, this comes at the cost of low flexibility (as each update depends on previous updates) and requires tracking of a state (the distributor and the subscriber need to keep track of the published updates). In one case, a signature may be defined based on recursive hashes, where a hash of an ith update depends on a hash for a previous i-th update. However, this doesn't avoid the problems of low flexibility or needing to track a state.

The comparative solution presented in the paper "Securing Update Propagation with Homomorphic Hashing" by Lewi et al. provides scalability but lacks flexibility or statelessness. Hence, this solution has similar benefits and downsides to the comparative approach described above. Each subscriber needs to keep a state consisting of a single hash corresponding to its current update state and the dependency between updates leads to low flexibility—updates have a strict ordering.

The present examples also differ from comparative incremental signature approaches, which enable rapid computation of an updated document. In this case, incremental signatures may be constructed in a generic way using a signature scheme, but the updated signature is generated by the signer themselves. In the present examples, a third party, such as the parent device, can compute an updated signature without requiring the private key (pk) of the distributor. Indeed, by using described examples, anyone may compute an updated set-homomorphic signature without secret information, where the set-homomorphic signature may still be used by an end subscriber to verify a set of updates (e.g. in a single verification operation).

Figure 5A:
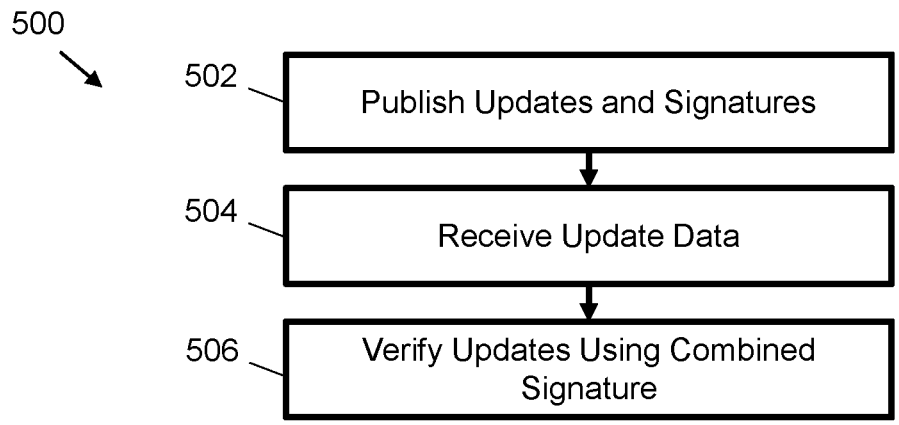
FIGS. 5A to 5D are a set of flow charts showing example methods associated with securely propagating an update.

FIG. 5A shows a method 500 of securely propagating an update according to an example. This method 500 may be applied in the context of the previously described examples or within a different system context. At block 502, the method comprises publishing a first update and a second update. These comprise a plurality of updates—and in other examples any number of updates equal to or greater than two in number may be substituted. Block 502 may be performed at a distributor. The first update is signed to generate an associated first digital signature and the second update is signed to generate an associated second digital signature. For example, the first and second digital signatures may be generated individually by the distributor. These may be generated at different times, e.g. the first update may be an update v.1.0 published at t1 and the second update may be an update V.1.5 published at t2, wherein t1 and t2 may be separated by days, weeks or months. Signing may be performed using a signature engine as shown in FIG. 2A.

At block 504, the method 500 comprises receiving update data and a combined digital signature. Block 504 may be performed at a subscriber and may occur at a time later that block 502, e.g. at a time t3 when the subscriber comes online and checks for updates. The update data comprises the first and second updates. The first and second updates may be received together or separately. The combined digital signature is a combination of the first and second digital signatures. The first, second and combined digital signatures are generated using a set-homomorphic digital signature scheme; as such, the combined digital signature may be generated by signing the update data with a secret key (e.g. at a distributor) or may be generated by a party that does not have access to the secret key by combining the first and second digital signatures. The combined digital signature may be generated by one of the distributor and an intermediate device, e.g. such as the parent devices shown in FIG. 3 or 4B.

At block 506, the method 500 comprises verifying the first and second updates using the combined digital signature. This may be performed using a verification engine as shown in FIG. 2B. Verification need only be performed once on the combined digital signature, as opposed to requiring individual verification blocks for each of the first and second digital signatures. If verification is successful the method 500 may further comprise applying the first and second updates at the subscriber, e.g. updating a subscriber database and/or updating software at the subscriber using the updates.

Although the method 500 is described with reference to two updates, it may be applied to any plurality of updates where fewer verification operations than the number of updates are required. The method 500 is flexible in that different combinations of single and combined signatures may be applied depending on conditions, e.g. a common verification function may be applied in both cases. For example, in certain cases, the method may further comprise publishing a plurality of further updates, each further update being signed to generate a plurality of associated further digital signatures; receiving update data comprising at least the plurality of further updates, and a combined digital signature, the combined digital signature being a digital signature for at least the plurality of further updates in combination; and verifying the plurality of further updates using the combined digital signature. In this case, the blocks 502 to 506 may be repeated over time for different batches of updates.

Figure 5B:
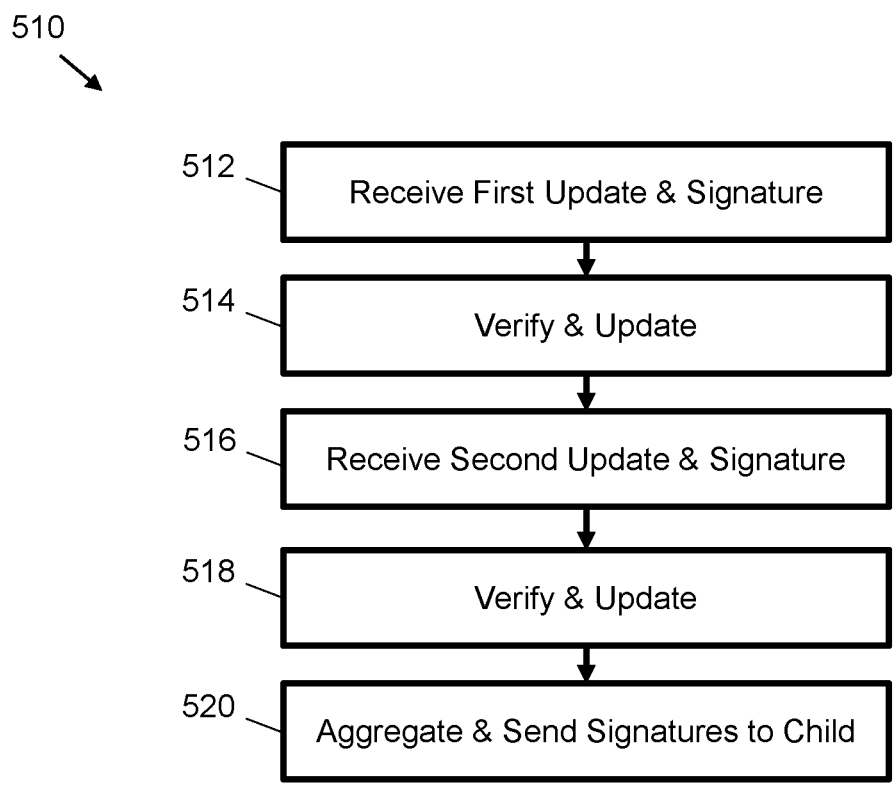

FIG. 5B shows a method 510 that may be applied at an intermediate device in association with the method 500. For example, the intermediate device may comprise a device located on a network path between the distributor and the subscriber. The intermediate device may comprise any of the parent devices of FIGS. 3 and 4B.

At block 512, a first update and an associated first digital signature are received at the intermediate device. This may occur at a time between t1 and t2, e.g. before the second update is published, or may occur at a time after t2. At block 514, the intermediate device verifies the first update using the first digital signature. If the verification is successful, the first update is applied at the intermediate device. The intermediate device may thus comprise a further subscriber located on a network path between the distributor and subscriber of method 500. If verification is not successful, the intermediate device may request or re-request the first update from the distributor or another device. Blocks 512 and 514 may be repeated a fixed number of times until verification is successful. If the fixed number of times is reached, a warning may be sent to one or more of the distributor and the other subscribers and the rest of the method 510 may be aborted.

Responsive to the first update being successfully received, verified and applied, operations similar to blocks 512 and 514 may be performed at blocks 516 and 518 with respect to a second update. For example, block 516 may comprise receiving, at the intermediate device, the second update and the second digital signature and block 518 may comprise verifying, at the intermediate device, the second update using the second digital signature. Blocks 516 and 518 may be performed at a later time, e.g. after t2 following publication of the second update by the distributor. If the verification is unsuccessful, the update operations may be repeated and/or warnings issued as per the verification of the first update. Responsive to a successful verification, the intermediate device may apply the second update.

Further responsive to the successful verification at block 518, the intermediate device may generate an update package for child subscribers. This is shown at block 520, where the intermediate device generates a combined digital signature by combining the first and second digital signatures received at blocks 512 and 516. The update package may thus comprise the first and second updates and the combined digital signature. Combining the signatures works as the digital signature scheme is set homomorphic. Block 520 may further comprise sending the update package comprising the first and second updates and the combined digital signature from the intermediate device to a further subscriber. Block 520 may be performed automatically, and/or responsive to a request from the further subscriber. For example, block 520 may be performed in response to a further subscriber device coming online and connecting with the intermediate device and requesting one or more missed updates to apply.

As a stand-alone method performed at an intermediate device, the method 510 may be performed by receiving, at a parent device, a request for update data comprising a first update and a second update from a child subscriber, the first update being published with a first digital signature for verification and the second update being published with a second digital signature for verification, the first and second digital signatures being generated according to a set-homomorphic digital signature scheme; combining, at the parent device, the first and second signatures to generate a combined digital signature; and sending the update data and the combined digital signature from the parent device to the child subscriber, wherein the child subscriber is configured to verify the update data using the combined signature in place of the first and second signatures. The parent device may comprise a distributor of the first and second updates or a parent subscriber. The combining may comprise summing or multiplication.

Figure 5C:
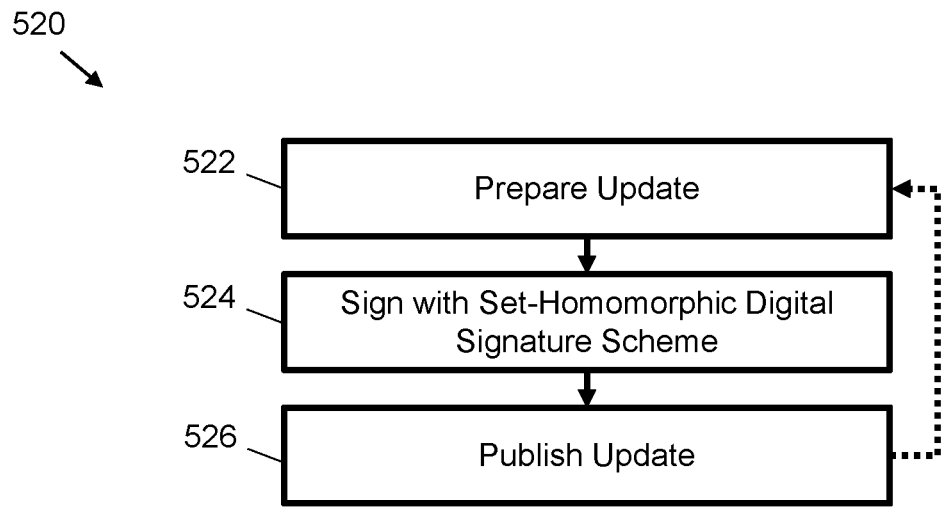

FIG. 5C shows a method 520 of securely publishing an update. The method may be performed at a distributor as described herein. At block 522, the method comprises preparing an update. The update may comprise a software update (including firmware updates), a database update or an information update (such as a post or message). At block 524, the method comprises signing the update according to a set-homomorphic digital signature scheme to generate an associated digital signature. Block 524 may be performed using the signature engine 210 shown in FIG. 2A. At block 526, the update is published. This may comprise making the update and the associated digital signature publicly available. This may comprise providing an interface that returns the update and the associated digital signature in response to a request using a communication protocol (such as the Internet Protocol (IP), the Transmission Control Protocol (TCP) and/or Hypertext Transfer Protocol (HTTP) or its secure variant (HTTPS)). Alternatively, this may comprise transmitting the update and the associated digital signature to a predefined set of devices, e.g. a list of subscribing parent devices and/or subscribers.

As shown by the dotted line, the method 520 may be repeated for a plurality of updates, including first and second updates. In this example, a plurality of published updates are verifiable by a subscriber using a combined digital signature generated according to the set-homomorphic digital signature scheme, the combined digital signature being generated by combining digital signatures associated with the plurality of published updates. The combined digital signature is useable, e.g. for verification, in place of the individual digital signatures associated with the plurality of published updates.

Prior to block 522, the method 520 may comprise a key generation operation. This may comprise generating a key pair for the set-homomorphic digital signature scheme. The key generation operation, a signing function performed at block 524, and a verification function performed by a subscriber may form the framework of the set-homomorphic digital signature scheme. The key pair comprises a public key (pk) and a secret key (sk). The secret key is a key private to the distributor. The method may comprise publishing the public key, e.g. distributing the public key to one or more subscribers such that the subscribers can use the public key in a verification function to verify that data originates from the publishing entity. In this case, block 524 may comprise signing update data using a signing function of the set-homomorphic digital signature scheme, the signing function being a function of the update data and the secret key.

In certain cases, the distributor itself may generate a combined digital signature according to the set-homomorphic digital signature scheme by combining a plurality of digital signatures. In this case, the combined digital signature is verifiable as a replacement for a combined digital signature generated by passing a plurality of corresponding updates as update data to the signing function along with the secret key. The distributor may prefer to generate the combined digital signature by combining the individual digital signatures as this may be less resource intensive than the signing function. For example, in an asynchronous system, the distributor, like the parent or intermediate devices discussed herein, may receive a request from a subscriber for a plurality of missing updates. For essential security updates, e.g. in response to a located bug, there may be a high load on the distributor from a large number of subscribers, where different subscribers may require different combinations of updates. In this case, it may be much quicker to combine digital signatures for different requested batches than generate a new combined digital signature using a signing function.

Figure 5D:
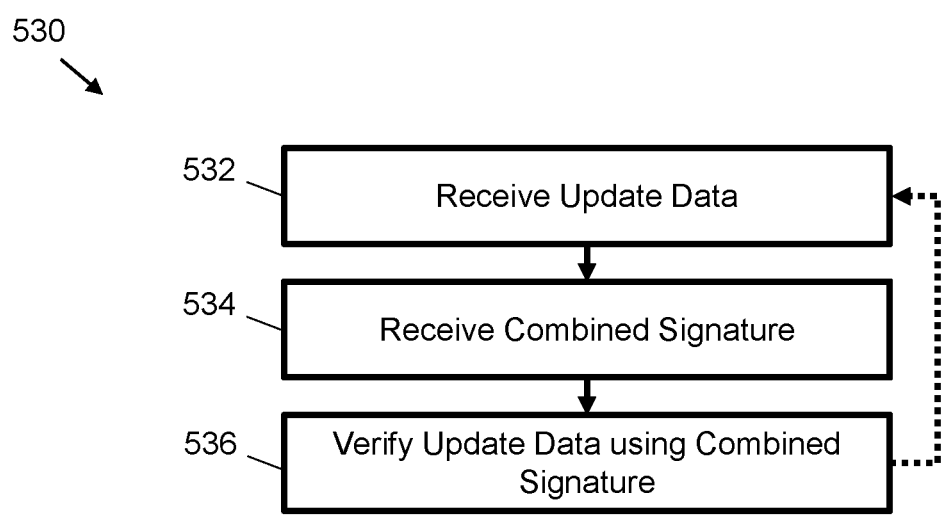

FIG. 5D shows a last method 530 that may be performed by an end subscriber device. The method 530 may be performed following block 526 of FIG. 5C or block 520 of FIG. 5B. It may also be seen as an implementation of blocks 504 and 506 in FIG. 5A. At block 532 in the method 530, update data comprising a plurality of updates is received. As before the update data may be received as one portion of data or as separate portions of data. In one case, the update data may be received in response to a request by the end subscriber for missing updates. The request may be made to a distributor and/or a parent or intermediate device. The plurality of updates may originally be published according to the method 520 of FIG. 5C, e.g. with each of the plurality of updates having an associated individual digital signature generated according to a set-homomorphic digital signature scheme. At block 534, a combined digital signature is also received. The combined digital signature is also generated according to the set-homomorphic digital signature scheme. The combined digital signature may be generated by combining the plurality of individual digital signatures, e.g. as described with reference to block 520 of FIG. 5B. At block 536, the end subscriber is configured to verify the update data using the combined digital signature in place of the plurality of individual digital signatures. Responsive to a successful verification, the missing updates (i.e. the requested plurality) may be applied. Responsive to an unsuccessful verification, blocks 532 and 524 may be repeated and/or a security warning may be sent to the source of the update data.

In one case, verifying the update data may comprise applying a verification function. The verification function may be similar to that applied by the verification engine 260 of FIG. 2B. The verification function may receive, as input, the update data, the combined digital signature and a public key for the distributor of the plurality of updates.

Figure 6:
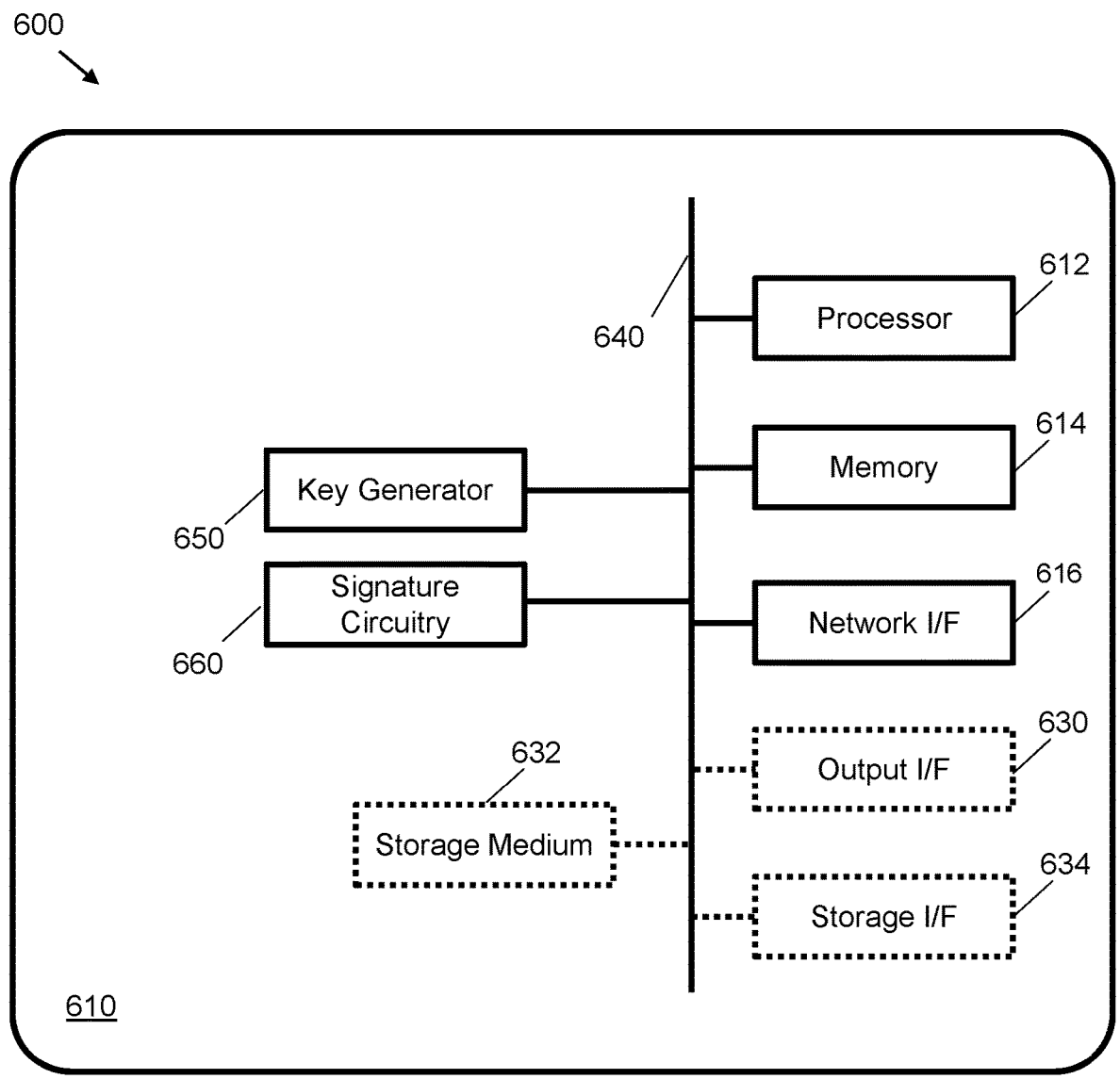
FIG. 6 is a schematic illustration showing a distributor according to an example.
Figure 7:
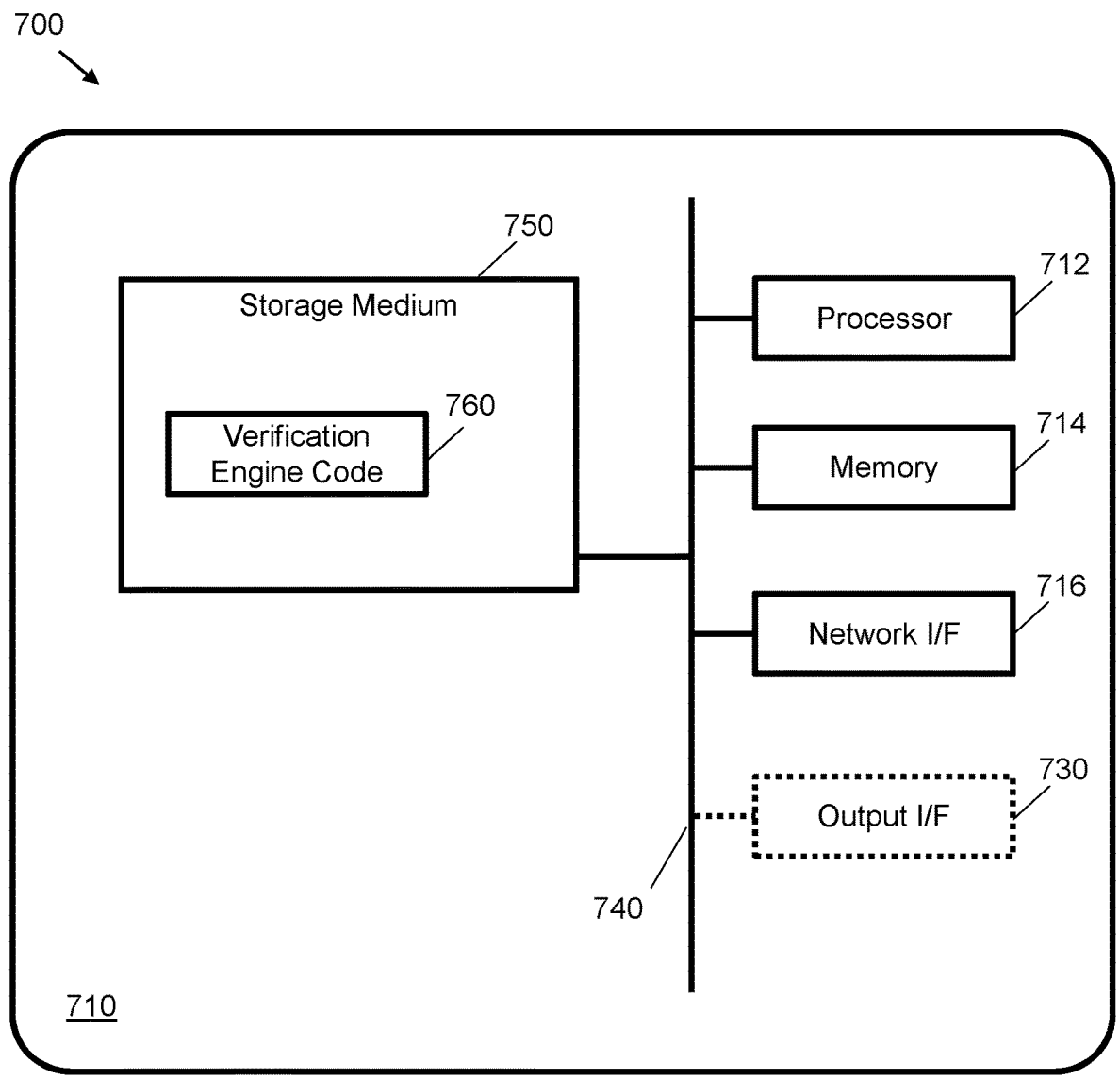
FIG. 7 is a schematic illustration showing a subscriber according to an example.

FIGS. 6 and 7 show respective examples of a distributor 600 and a subscriber 700. The example of the distributor 600 uses a more hardware-based approach to implement the set-homomorphic digital signature scheme described herein and the example of the subscriber 700 uses a more software-based approach. Only two examples are described for conciseness but it should be noted that the more software-based approach of FIG. 7 may be alternatively used to implement the distributor and/or the more hardware-based approach of FIG. 6 may be alternatively used to implement the subscriber. The actual choice of implementation may depend on specific application requirements (e.g. embedded devices or devices that need to react at scale may use a more hardware-based approach).

FIG. 6 shows a computing device 610 that implements the distributor 600. The computing device 610 comprises at least one processor 612, a memory 614, and a network interface 616. In certain examples, one or more of an output interface 630, a storage medium 632 and a storage interface 634 may also be provided. These components are electrically coupled using a systems bus 640. The network interface 616 may couple the computing device 610 to the one or more networks 130 of FIG. 1. The computing device 610 also comprises electronic circuitry to implement a number of cryptographic functions. This electronic circuitry may comprise one or more microprocessors or modular processing systems. In certain examples, the electronic circuitry may comprise dedicated processing chips that are securely installed on a motherboard of the computing device 610, e.g. in the form of SoCs, ASICs or FPGAs. The electronic circuitry includes a key generator 650 and signature circuitry 660. The signature circuitry 660 may implement the signature engine 210 of FIG. 2A. The key generator 650 may comprise a hardware implementation of a key generation function or algorithm as described herein. The signature circuitry 660 may be used to individually sign updates, e.g. as per block 524 of FIG. 5C. The key generator 650 may be used to generate a public-secret key pair as described herein. The network interface 616 may be used to transmit the updates, the digital signatures and the public key as described in the methods herein. Updates may be prepared from or using the storage medium 632 and the storage interface 634. The method 520 of FIG. 5C may be performed by computer program code loaded into the memory 614 and executed by the processor 612, wherein the processor 614 calls upon one or more of the key generator 650 and the signature circuitry 650 to perform the cryptographic operations described herein.

FIG. 7 shows a computing device 710 that may be used to implement a subscriber 700. The computing device 710 is a variation of the computing device 610 of FIG. 6. The computing device 710 comprises at least one processor 712, a memory 714, and a network interface 716. In certain examples, the computing device 710 comprises at least an output interface 730. Components are again communicatively coupled by a systems bus 740. In FIG. 7, a computer-readable storage medium 750 comprises computer program code (i.e. instructions) to implement one or more cryptographic functions as described herein. The storage medium 750 may be non-transitory, e.g. a magnetic or solid-state disk drive or the like. The storage medium 750 comprises, in the case of FIG. 7, computer program code to implement a verification engine 760. This may comprise computer program code to implement the verification engine 260 from FIG. 2B. The computer program code may be loaded into the memory 714 for execution by the at least one processor 712. The computer program code may form part of an operating system of the computing device 710, e.g. may be securely executed as part of a kernel or operating system service in protected memory. The computing device 710 may be used to implement method 530 shown in FIG. 5D.

In one case, a distributor may use a similar storage medium configuration to the computing device 710. In this case, as well as, or instead of the verification engine code 760, the storage medium 750 may store key generator code to implement a key generation function or algorithm and signature engine code to implement a signing function or signature engine. In general, a non-transitory computer-readable storage medium may store instructions that, when executed by a processor, cause the processor to perform any of the methods described herein.

In certain examples, the set-homomorphic digital signature scheme may comprise signing and verification functions that use set-homomorphic hashes. For example, a set-homomorphic hash function may be applied to an update (e.g. a "message") in a signing function to generate at least a portion of a signature. The same set-homomorphic hash function may be applied again to an update (e.g. a "message") in a verification function. For example, the verification function may compute a function of the signature, a set-homomorphic hash function of the update data and the public key In certain examples, a set homomorphic digital signature scheme may be based on a lattice-based digital signature scheme. The lattice-based digital signature scheme may be based on a Ring Learning With Errors (Ring-LWE) scheme. Digital signatures schemes including those that are lattice-based may, in general, be divided into two types of schemes: 1) Fiat-Shamir type schemes; and 2) hash-then-sign type schemes. In examples described herein, lattice-based digital signature schemes of the second "hash-then-sign" type may be used. In these schemes, the binary operator may be binary addition.

In other examples, a set homomorphic digital signature scheme may be based on other base signatures, such as an RSA digital signature scheme or a BLS digital signature scheme. In these cases, the binary operator may be binary multiplication.

One example of a suitable lattice-based hash-then-sign digital signature scheme is the FALCON scheme described by Thomas Prest et al. in the FALCON technical report, published by the National Institute of Standards and Technology in 2019 (which is incorporated herein by reference). This digital signature scheme may be seen as a particular instantiation of a lattice-based hash-then-sign digital signature scheme. Other instantiations also exist and may also be used as the set-homomorphic digital signature scheme described herein. Although reference is made to an implementation using FALCON, other implementations are possible.

In a lattice-based hash-then-sign digital signature scheme such as FALCON above, the public key, private key and digital signatures may be represented by one or several elements of the ring $\mathcal{R}$ (i.e. an algebraic structure consisting of a set with binary operations). In particular, in certain instantiations keys and digital signatures may comprise matrices or vectors with coefficients in the ring $\mathcal{R}$.

As an example using the FALCON instantiation, the ring space for the digital signatures (including first, second and combined digital signatures) $\mathcal{R}$ may be defined as:

$$\frac{\mathbb{Z}[x]}{x^n+1}$$

where $\mathbb{Z}$ represents the set of integers and n represents a configurable parameter. In other examples, other rings may be used. The ring space of the public key $\mathcal{R}_q$ using the FALCON instantiation may equal $\mathcal{R}/q\mathcal{R}$ where q is a configurable parameter that is used as an integer modulus. The ring space of the private key using the FALCON instantiation may be a larger ring space $\mathcal{R}^{2\times 2}$. Elements of $\mathcal{R}$ may comprise polynomials with integer coefficients of degree at most n−1. Elements of $\mathcal{R}$ may also have an additional constraint that their coefficients are in $\{0, 1, \ldots, q-1\}$. The lattice-based digital signature scheme may be β-weakly homomorphic where β is greater than 0. It may also be Q-verification key simulatable. The FALCON scheme has these properties.

Lattice-based digital signature schemes, such as those based on Ring-LWE schemes, have an additional advantage of providing for post-quantum security, e.g. they remain secure in a world of quantum computing. The FALCON scheme further provides a compact implementation that may be implemented on low resource devices. In other examples, the set-homomorphic digital signature scheme may be based on the approaches described in the paper by Craig Gentry et al. "Trapdoors for hard lattices and new cryptographic constructions" as published in Richard E. Ladner and Cynthia Dwork, editors, 40th ACM STOC, pages 197-206. ACM Press, May 2008 (which is incorporated herein by reference). This may be seen to be another example of a lattice-based hash-then-sign scheme. Alternatively, the set-homomorphic digital signature scheme may be based on the approaches related to the NTRUSign signature algorithm described by Jeffrey Hoffstein et al. in the paper "NTRU-Sign: Digital Signatures Using the NTRU Lattice" published in Topics in Cryptology (CT-RSA 2003 LNC. 2612 Springer pp. 122-140—which is incorporated herein by reference).

In certain examples, such as the lattice-based digital signature schemes described above, the signing function computes a digital signature according a signature size constraint and the verification function checks whether the signature meets one or more signature size constraints. In lattice-based digital signature schemes, the larger a signature is the easier it may be to forge. Hence, ensuring that each digital signature is below a predefined size constraint helps to maintain a predefined level of security. The size constraint may be chosen such that the aggregation of k signatures (e.g. via summation as described herein) is shorter than a predefined factor β with a predefined probability. The integer modulus q described above may be selected such that it is greater than (and/or equal to) the predefined factor β This may help rule out situations where a security level is unclear. A further safety factor may be applied by adding an additional bound on the infinity norm of digital signatures $\beta_\infty$.

Figures 8, 9:
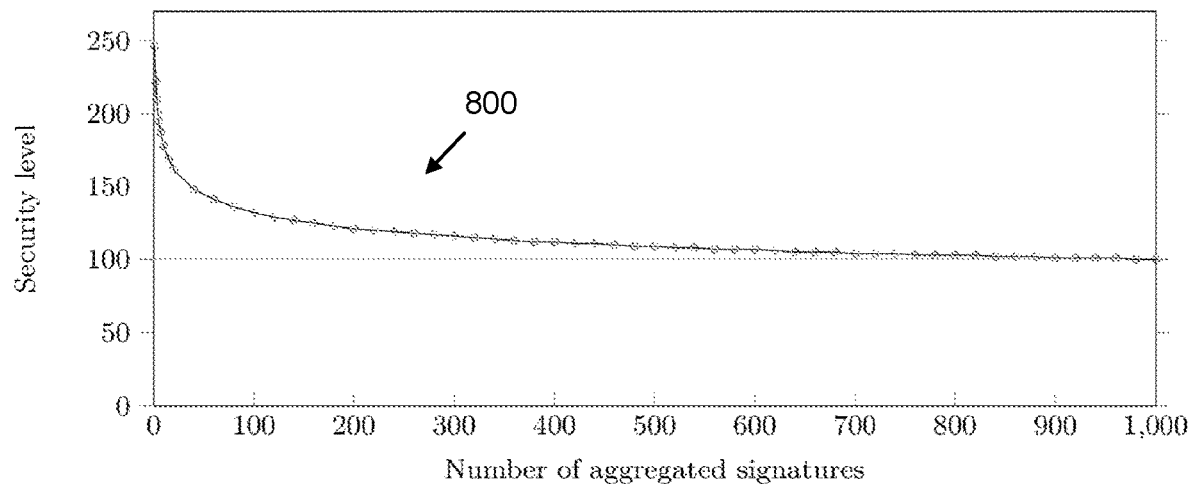
FIG. 8 is a chart showing how a security level varies with a number of aggregated signatures for one test digital signature scheme.
FIG. 9 is a table showing an example set of parameter values for the test digital signature scheme.

FIG. 8 shows how a security level may be dependent on a number of aggregated signatures. This example is provided based on a test case that uses the above-cited FALCON digital signature scheme where digital signatures are summed. The graph 800 shows how a security level may decrease as the number of aggregated signatures increases. The security level may represent an combined metric for a number of different known security attacks, e.g. as used in the paper by Martin R. Albrecht et al. titled "On the concrete hardness of Learning with Errors", Journal of Mathematical Cryptology, Volume 9, Issue 3, Pages 169-203, ISSN 1862-2976, October 2015 (which is incorporated herein by reference). As can be seen in FIG. 8, there is a graceful degradation with the number of aggregations and a predefined minimum security level may be set (e.g. in FIG. 8 this is 100). In certain cases, to maintain a higher desired security level, an upper bound on the number of aggregations may be fixed (e.g. 1000). Above this upper bound, a new combined signature may be generated (e.g. such that 2000 updates may have two combined digital signatures).

FIG. 9 shows a set of example parameter values for a test implementation based on the FALCON digital signature scheme. These values are for example only and may vary depending on implementation and requirements. In this case, the ring dimension n has a value of 1024, the integer modulus q has a value of 6873089, the standard deviation of the scheme σ is $1.54\sqrt{q}$, the number of supported aggregations k is 1000, a size constraint β (e.g. a constraint on the L2 norm between two signatures) is set as $\lceil \tau_{SIG} \cdot \sigma \sqrt{2nk} \rceil$, where $\tau_{SIG}$ is 1.2, and an upper bound on the infinity norm of digital signatures $\beta_\infty$ is $\lceil \sigma\sqrt{2k \cdot \log(4n/p)} \rceil$ where p may equal $2^{-110}$. The signature size (shown in FIG. 9 as the size of the secret key (sk)) is 2816 bytes after aggregating k signatures and the quantum security level λ (e.g. as shown on the y-axis of FIG. 8) is set at 100.

FIGS. 10A, 10B and 10C show an example set of algorithms that may be used as a basis for an implementation of a set-homomorphic digital signature scheme. This example is again based on the FALCON digital signature scheme. In other cases, different algorithms may be applied for different base digital signature schemes.

FIG. 10A shows an example key generation function KeyGen(n, q) that takes a ring dimension n and an integer modulus q (e.g. as described above) and that returns a public key (pk) and a secret or private key (sk). The key generation operation of FIG. 10A has three sub-operations. In a first operation, a ring is defined based on the ring dimension and a set of short polynomials are generated within the ring—f, g, F, G—such that fG−gF=q. In a second operation, the public key is generated as polynomial h such that pk=h=g·f$^{-1}$ mod q, wherein the public key forms part of the ring. In a third operation, the secret key is generated as variable B such that $$B = \begin{bmatrix} g | -f \\ G | -F \end{bmatrix}.$$

FIG. 10B shows an example signing function Sign(msg, sk) that takes a message msg and a private or secret key sk and returns a digital signature sig. The signing function may be used to implement the signature engine 210 of FIG. 2A, and the msg may be seen as the data for the update (e.g. as a binary string). The signing function of FIG. 10B computes two elements within a defined ring (e.g. as discussed above)—$s_1$ and $s_2$. These elements are of the same form as the signatures and one of the elements is returned as the digital signature from the signing function. Although only a single element—$s_2$—is returned to reduce the size of the digital signature, in another case both $s_1$ and $s_2$ may form the signature (only one element is needed as the other element may be reconstructed with a verifying function as shown in FIG. 10C).

In the example of FIG. 10B, the signing function computes the two elements subject to a set of constraints. A first constraint is that a function of the two elements and the public key (shown as h in FIG. 10B) equals a hash function that takes at least the message as an input. The hash may be a set-homomorphic hash function. Although not shown in the Figure, in certain cases, the hash function may also take a salt term r as well as the message (e.g. H(r||msg). The salt term may be randomly generated for each signing operation. The two remaining constraints are size constraints as described above. A first size constraint looks at the L2 norm of the two elements and checks this is less than or equal to a defined size factor (or upper bound) $\beta$. A second size constraint, which is explained as an additional safety term, is based on an upper bound $\beta_\infty$ for the infinity norm of the two elements.

FIG. 10C shows an example verification function Verify (msg, sig, pk) that takes a message msg, a digital signature sig and a public key pk as input and that returns 'True' or 'False' depending on whether the message and digital signature are verified (True') or not ('False'). The digital signature sig in this example is a digital signature generated by the example signing function Sign(msg, sk) of FIG. 10B. As a first operation, a second digital signature element is generated based on the input digital signature. For example, if sig equals $s_2$ from FIG. 10B then element $s_1$ is determined. The two elements are then checked against a hash function applied to at least the message msg, and a transformation of the element 51 with the public key, which is used as h in the Figure. The first operation may comprise a single operation to check whether the equality shown on line 1 of FIG. 10C holds. If the equality does not hold then 'False' is returned, i.e. the message and signature are not verified. If the equality holds, then a further check on the size of the elements is performed. This check is similar to the check performed in the signing function. In the present example, a check is made as to whether the L2 norm and the infinity norm are within the upper bounds $\beta$ and $\beta_\infty$. In other examples, other size measures may be used. If the size constraints are met then the message and the signature are verified and 'True' is output. If the size constraints are not met then the message and signature are not verified and 'False' is output.

As shown in the examples of FIGS. 10B and 10C, in certain cases, the signing function and the verification function may use a hash function (H( . . . )). In cryptography, a hash function maps bit strings of arbitrary size to a bit string (called a hash or hash digest) of a fixed size; it requires the important property that the function is collision-resistant, which means that given a set of pre-image and image, it should be infeasible to find another pre-image that maps to the given image. Cryptographic hash functions may be seen as the electronic equivalent of fingerprints, as they provide a concise way to guarantee the integrity of a document: even the slightest change to a bit string will completely change its hash. The hash function described herein may be a set homomorphic hash function such that, for any disjoint sets S, T: H(S∪T)=H(S)*H(T), where * is a binary operation as described above.

Certain examples described herein may be used to enhance comparative solutions to provide the benefits of scalability, flexibility and statelessness. The examples described herein may be used with update policies that set out detailed rules for applying updates based on distributor and/or subscriber properties. The examples can allow each subscriber to only request, download, verify and apply updates based on the software that a computing device has installed such that each subscriber may receive a distinct subset of updates. Fine-grained policies may allow interdependent or independent updates and applications, e.g. for mobile operating system updates. The examples described herein, when applied in the context of software updates within Linux-like operating systems, may reduce the bandwidth and computation overhead by an order of magnitude or more. In addition, different users may install distinct software, which requires a level of flexibility which does not seem to be met by comparative scalable solutions. The present examples further allow different items of software to have their own update policy, e.g. such as the set of dependencies defined for Linux updates.

Certain examples described herein are scalable and can accommodate large numbers of subscribers that each may desire to receive differentiated batches of updates. The examples may cope with out-of-order updates and missing updates, based on the fact that an applied binary operator, such as summation or multiplication of digital signatures, is associative and commutative. This provides flexibility and allows subscribers to cope with intermittent and unreliable connections. The same flexibility also allows a large range of different update policies to be accommodated. The examples also provide statelessness, e.g. for all parties, which simplifies deployment and implementation. Parties do not need to remember previous events or interactions. Although examples are described based on the roles of distributor and subscriber, it should be noted that in peer-to-peer and other arrangements these roles may be exchangeable, such that a distributor at one point in time may become a subscriber at a different point in time.

Certain system components and methods described herein may be implemented by way of computer program code that is storable on a non-transitory storage medium, e.g. as described with reference to FIG. 7. The above examples are to be understood as illustrative. Further examples are envisaged. Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A method of securely propagating updates, the method comprising:
publishing, at a distributor, a plurality of updates, each update being signed to generate an associated digital signature for the update;
receiving, at a subscriber, update data for the plurality of updates and a combined digital signature, the combined digital signature being a combination of a plurality of digital signatures for the plurality of updates; and
verifying the plurality of updates using the combined digital signature, wherein the plurality of digital signatures and the combined digital signature are generated using a set-homomorphic digital signature scheme, wherein, within the set-homomorphic digital signature scheme, a signature of a union of a first message and a second message is equal to an associative and commutative binary operation applied to a first signature of the first message and a second signature of the second message.

2. The method of claim 1, comprising:
generating the combined digital signature by aggregating the plurality of digital signatures.

3. The method of claim 2, wherein aggregating the plurality of digital signatures comprises applying the associative and commutative binary operation.

4. The method of claim 3, wherein aggregating the plurality of digital signatures comprises summing or multiplying the plurality of digital signatures.

5. The method of claim 1, comprising:
generating the combined digital signature by signing the update data using the set-homomorphic digital signature scheme.

6. The method of claim 1, wherein the combined digital signature is generated by one of the distributor and an intermediate device.

7. The method of claim 1, comprising:
receiving, at an intermediate device, a first update in the plurality of updates and a first digital signature in the plurality of digital signatures;
receiving, at the intermediate device, a second update in the plurality of updates and a second digital signature in the plurality of digital signatures;
generating, at the intermediate device, the combined digital signature by aggregating the first and second digital signatures; and
sending the update data comprising the first and second updates and the combined digital signature from the intermediate device to the subscriber.

8. The method of claim 7, comprising:
verifying, at the intermediate device, the first update using the first digital signature;
applying, at the intermediate device, the first update in response to a successful verification of the first update;
verifying, at the intermediate device, the second update using the second digital signature; and
applying, at the intermediate device, the second update in response to a successful verification of the second update.

9. The method of claim 7, wherein generating the combined digital signature and sending the update data is performed at the intermediate device in response to a request from the subscriber.

10. The method of claim 1, comprising:
applying the plurality of updates at the subscriber in response to a successful verification of the plurality of updates using the combined digital signature.

11. The method of claim 1, wherein the set-homomorphic digital signature scheme defines a limit on a total number of digital signature combinations.

12. The method of claim 1, wherein the set-homomorphic digital signature scheme uses a set-homomorphic hash function.

13. The method of claim 1, wherein the set-homomorphic digital signature scheme is a lattice-based digital signature scheme, wherein the digital signatures and cryptographic keys of the digital signature scheme are matrices or vectors whose coefficients are ring elements.

14. The method of claim 1, wherein the set-homomorphic digital signature scheme is based on at least one of (i) a Rivest Shamir Adleman—RSA—digital signature scheme, (ii) a Boneh Lynn Shacham—BLS—digital signature scheme, or (iii) a lattice-based digital signature scheme, and wherein the digital signatures are combined using a multiplication operation or a summation operation or both.

15. A method of securely publishing updates, the method comprising:
preparing a first update;
signing the first update according to a set-homomorphic digital signature scheme to generate a first digital signature;
publishing the first update;
preparing a second update;
signing the second update according to the set-homomorphic digital signature scheme to generate a second digital signature; and
publishing the second update,
wherein the first and second updates are verifiable by a subscriber using a combined digital signature generated according to the set-homomorphic digital signature scheme, the combined digital signature being generated by combining the first and second digital signatures, the combined digital signature being useable in place of the first and second digital signatures,
wherein the method further comprises:
generating a key pair for the set-homomorphic digital signature scheme, the key pair comprising a public key and a secret key; and
publishing the public key;
wherein signing the first update and signing the second update comprises:
signing update data using a signing function of the set-homomorphic digital signature scheme, the signing function being a function of the update data and the secret key.

16. The method of claim 15, comprising:
generating the combined digital signature according to the set-homomorphic digital signature scheme by aggregating the first and second digital signatures using a binary operator, wherein the combined digital signature is verifiable as a replacement for a combined digital signature generated by passing the first and second updates as update data to the signing function along with the secret key.

17. The method of claim 15, wherein generating a key pair comprises:
obtaining a ring dimension and an integer modulus q;
defining a ring based on the ring dimension;
generating a set of short polynomials within the ring—f, g, F, G—such that fG−gF=q;
generating the public key pk such that pk=g·f$^{-1}$ mod q, wherein the public key forms part of the ring; and
generating the secret key B such that $$B = \begin{bmatrix} g | -f \\ G | -F \end{bmatrix}.$$

18. The method of claim 17, wherein:
the signing function computes two elements within the defined ring and a set-homomorphic hash function of the update data,
the two elements are computed to meet at least one defined size constraint, the set-homomorphic hash function of the update data is set to equal a function of the two elements and the public key, and one or more of the two elements are output by the signing function as a digital signature for the update data.

19. The method of claim 15, wherein the signing function computes a digital signature according a signature size constraint.

20. The method of claim 15, wherein the first and second updates are published according to an update policy, the update policy defining one or more conditions to meet for one or more subscribers to apply at least one of the first and second updates.

21. A method of securely verifying updates, the method comprising:

receiving update data comprising a plurality of updates, each update being published with an associated digital signature for verification, a plurality of associated digital signatures for the updates being generated according to a set-homomorphic digital signature scheme;

receiving a combined digital signature generated according to the set-homomorphic digital signature scheme, the combined digital signature being generated by combining the plurality of associated digital signatures; and verifying the update data using the combined digital signature in place of the plurality of digital signatures wherein, within the set-homomorphic digital signature scheme, a signature of a union of a first message and a second message is equal to an associative and commutative binary operation applied to a first signature of the first message and a second signature of the second message.

22. The method of claim 21, wherein verifying the update data comprising applying a verification function, the verification function receiving as input the update data, the combined digital signature and a public key for a distributor of the plurality of updates.

23. The method of claim 22, wherein the verification function computes a function of the signature, a set-homomorphic hash function of the update data and the public key.

24. The method of claim 22, wherein the verification function checks whether the signature meets one or more signature size constraints.

* * * * *